United States Patent
Dehne (10) Patent No.: US 10,638,720 B2
(45) Date of Patent: May 5, 2020

(54) LITTER BOX WALL SHIELD (71) Applicant: Maureen L. Dehne, Englewood, CO (US)

(72) Inventor: Maureen L. Dehne, Englewood, CO (US)

( * ) Notice: Subject to any disclaimer, the term of this patent is extended or adjusted under 35 U.S.C. 154(b) by 152 days.

(21) Appl. No.: 15/941,470

(22) Filed: Mar. 30, 2018

(65) Prior Publication Data

US 2018/0279577 A1 Oct. 4, 2018

Related U.S. Application Data

(60) Provisional application No. 62/479,195, filed on Mar. 30, 2017.

(51) Int. Cl.
*A01K 1/01* (2006.01)

(52) U.S. Cl.
CPC .......... *A01K 1/0107* (2013.01); *A01K 1/0125* (2013.01)

(58) Field of Classification Search
CPC .. A01K 1/0107; A01K 1/0114; A01K 1/0125; A01K 13/001
USPC .................................................. 119/165–170
See application file for complete search history.

(56) References Cited

U.S. PATENT DOCUMENTS

| | | | |
|---|---|---|---|
| 3,570,376 A * | 3/1971 | Overton, III | E01F 9/623 52/38 |
| 3,990,397 A * | 11/1976 | Lowe, Jr. | A01K 1/0107 119/165 |
| 4,271,544 A * | 6/1981 | Hammond | A01K 1/0121 119/162 |
| 4,840,140 A * | 6/1989 | Yananton | A01K 1/0107 119/169 |
| 4,848,274 A * | 7/1989 | Yananton | A01K 1/0107 119/169 |
| 5,027,748 A | 7/1991 | Wolak | |
| 5,080,044 A * | 1/1992 | Bosworth | A01K 1/0125 119/168 |
| 5,094,188 A | 3/1992 | Wolak | |
| 5,134,974 A * | 8/1992 | Houser | A01K 1/0125 119/168 |
| 6,062,169 A | 5/2000 | Wade | |
| 6,332,429 B1 * | 12/2001 | Gramlich | A01K 1/0107 119/165 |
| 7,150,242 B2 | 12/2006 | Schuster | |
| 7,921,812 B1 * | 4/2011 | Carrillo | A01K 13/001 119/602 |
| 8,191,509 B2 | 6/2012 | Fountain | |
| 8,720,380 B1 * | 5/2014 | Skirbe | A47K 1/12 119/600 |

(Continued)

*Primary Examiner* — Magdalena Toploski
*Assistant Examiner* — William L Gmoser
(74) *Attorney, Agent, or Firm* — Patent Law Offices of Rick Martin, P.C.

(57) ABSTRACT

A plastic litter box has reinforced corners with support holes for posts. Rectangular, square or triangular shapes are included. Each post has a hook. A singular piece curtain is hung on the hooks all around the inner walls of the base of the litter box. The pet entrance is left open without the curtain. The curtain hangs down about half way along the sides of the base. The base walls can extend outward at the middle and be straight sided, or can have inward slanting walls to cause a contact with the curtain and keep waste from getting behind the curtain. The base corners can be contoured to eliminate any waste buildup and facilitate cleaning.

8 Claims, 8 Drawing Sheets

(56) References Cited

U.S. PATENT DOCUMENTS

| | | |
|---|---|---|
| 2005/0115509 A1 | 6/2005 | Rudolph |
| 2006/0102084 A1 | 5/2006 | Garfield |
| 2007/0084413 A1 | 4/2007 | Oertel |
| 2008/0060585 A1 | 3/2008 | Garfield |
| 2012/0227672 A1* | 9/2012 | Diskin ................ A01K 1/0107 119/161 |
| 2013/0055959 A1* | 3/2013 | Spectre ............... A01K 1/0107 119/165 |
| 2013/0192530 A1* | 8/2013 | Lovenvirth ............ A01K 1/011 119/163 |
| 2014/0150727 A1* | 6/2014 | Matsuo ............... A01K 1/0114 119/169 |
| 2015/0075438 A1* | 3/2015 | Emenecker .......... A01K 1/0114 119/166 |
| 2016/0302380 A1* | 10/2016 | Hasegawa ........... A01K 1/0107 |
| 2018/0263209 A1* | 9/2018 | Ruggiano ........... A01K 1/0125 |

* cited by examiner

LITTER BOX WALL SHIELD

CROSS-REFERENCE APPLICATION

This is a non-provisional application claiming priority to provisional application Ser. No. 62/479,195 filed Mar. 30, 2017.

FIELD OF INVENTION

The present invention relates to providing a kitty litter box with a curtain to protect house walls against urine over spray, and to keep litter in the box.

BACKGROUND OF THE INVENTION

Some cats do not squat or have poor hips that keep them from squatting. This causes them to stand to urinate or in some cases spray after going to the bathroom. There are litter boxes with higher edges. However if you have a larger cat this still does not protect your walls and floors. There are litter boxes with tops/lids. However some cats do not like to go into them as well as when urine drains down the side of the top, it can cause odor between the top and bottom where the lid and litter pan meet. This can cause odor if it is not cleaned with regularity. In addition, some cats when covering their urine or feces, flick litter with a vengeance, and litter flies out of the box. The solution is to keep urine, feces, and litter in the box and to reduce the amount of time spent cleaning and to reduce smell.

Currently the only option for a cat that urinates outside the litter box because they do not squat is a high sided litter box or one with a lid. If the cat is tall then the owner is faced with buying a storage box and cutting their own entry hole for the cat. The hooded litter boxes collect urine between the top and bottom causing odor.

Pub. No. U.S 2006/0102084 discloses an extension frame for a standard litter box. The frame has fasteners upon which a curtain is draped to extend the curtain (side liner 28) above the litter box.

What is needed in the art is a new litter box with corner mounts for posts that support a curtain all around the litter box except for the pet entrance. The present invention has a plastic base with reinforced corners which support posts of a chosen height. A silicone curtain is preferably one piece. The curtain extends below the top of the litter box.

SUMMARY OF THE INVENTION

The main aspect of the present invention is to provide a new litter box having reinforced corners which support posts used to hang a one piece curtain from.

Another aspect of the present invention is to provide contoured bottom corners of the base to prevent waste buildup.

Another aspect of the present invention is to provide variable height posts.

Another aspect of the present invention is to contour inward the walls of the base to provide an engagement of the curtain to the walls and prevent waste from getting behind the curtain.

Another aspect of the present invention is to provide a magnet attachment of the curtain to the walls.

Another aspect of the present invention is to provide a variety of colors and designs (perhaps a mouse) on the curtains.

Another aspect of the present invention is to provide a single curtain to drape all around the litter box.

Another aspect of the present invention is to provide a cut line(s) on the curtain to allow a user to vary the height.

Another aspect of the present invention is to provide a stiff curtain and a gasket to attach to the litter box.

Other aspects of this invention will appear from the following description and appended claims, reference being made to the accompanying drawings forming a part of this specification wherein like reference characters designate corresponding parts in the several views.

What does the invention look like: The litter box is a rectangle or right triangle (corner unit). The rectangle is approximately 14"W, 18"L and has three sides 8"H. One of the 14" sides has a cut out reducing the height to 5" for a length of 6". This provides an easy entrance for the cat.

The right triangle has two sides 22"L (90 degree), the hypotenuse is 26"L (has pet entrance cutout) with box sides 8"H. The corners of the box is slightly rounded as is the side to the bottom of the box. On the outside of the box, located at each corner will be a curtain pole holder. The poles are square around, 19"H and have a hook, 1" from the top of the pole on one end. The end without the hook will fit into the pole holder. The rectangle comes with 4 poles. Additionally a curtain made out of a silicone sheet that is 18"W and 52"L. The triangle will have 3 poles with a flexible silicone sheet 18"W and 46"L. The silicone sheet will have holes corresponding to the pole hooks. The silicone curtain will fall approximately 4" into the litter box.

How does the invention work: Once the litter box with the wall shield is assembled and put into place, a cat will enter and if they do not squat to urinate, the urine will be sprayed against the silicone and drain into the litter box. Likewise, if the cat flicks litter, it will hit the silicone side and fall back into the litter box. Silicone is non-porous and therefore urine will not create any additional odor other than that of regular litter. The silicone is sturdy and is easily cleaned in a washing machine, dishwasher or hand washed in a sink. Silicone resists tearing and is color fast.

Purpose & Benefits

Provides cats with a uniquely-designed litter box capable of preventing pet waste and cat litter from being strewn or flung out of the box.

Features four upstanding silicone sidewalls capable of being installed via poles in each corner of the litter box, functioning as an effective barrier around the box.

Allows for urine, feces, and cat litter to drop down into the box, even if a cat attempts to cover their waste and move and/or fling litter over the sides of the box.

Reduces the amount of cleanup required by a pet owner when emptying the litter box on a daily basis.

Utilizes silicone materials for the sidewalls which enable owners to wash and sanitize the walls for continuous use.

Owners are able to visually inspect the litter box for cleaning needs.

To empty the waste in the box, the owner does not have to remove the lid and potentially have urine that has collected on the lid drip or touch other surrounding areas.

Problems Solved

When a cat uses a litter box, some may urinate or defecate near the sidewalls. Once finished, the cat may try to cover up their deposit and end up flinging waste and/or litter over the walls. Excessive unwanted odors could gather right outside the box, leading to an unsanitary and odorous room. Cleaning pet waste from the sides of the litter box can be difficult and frustrating.

Detailed Description & Features

Litter Box Wall Shield is an improved litter box with protective walls around each of the four edges. The litter box is comprised of a square, rectangular, or triangular base portion with slots/holes in each corner. Each of the holes is designed to accommodate a post which, in turn, supports a portion of an attachable silicone sidewall. The poles have a hook on one end, and the pole is inserted into the sleeves attached to the outside of the container. The silicone sidewall can then be installed on the hooks.

Once installed, the silicone sidewall provides a protective barrier around the box. A pet can use the box as desired, even being able to fling litter to cover their waste deposit without worry of any litter spilling onto the floor. The box keeps all waste and litter contained within the sidewalls, offering a much cleaner and more sanitary litter box. The sidewalls may be removed as needed for cleaning the interior of the box. Litter Box Wall Shield can be constructed using plastic, silicone, and other suitable materials. The rectangular box may measure approximately 18" in length and 14" in width. The triangular version may be available in similar sizes in order to accommodate all pet owner needs and preferences. Each pole may measure approximately 19" in total height to accommodate the sidewalls. Exact size, measurement, construction, and design specifications may vary upon manufacturing. When the cat flicks litter, it will hit the silicone side and fall back into the litter box. Silicone is non-porous and, therefore, urine will not create any additional odor other than that of a regular litter box. The silicone is sturdy and is easily cleaned in washing machine, dishwasher, or hand washed in a sink. Silicone resists tearing and is color fast.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
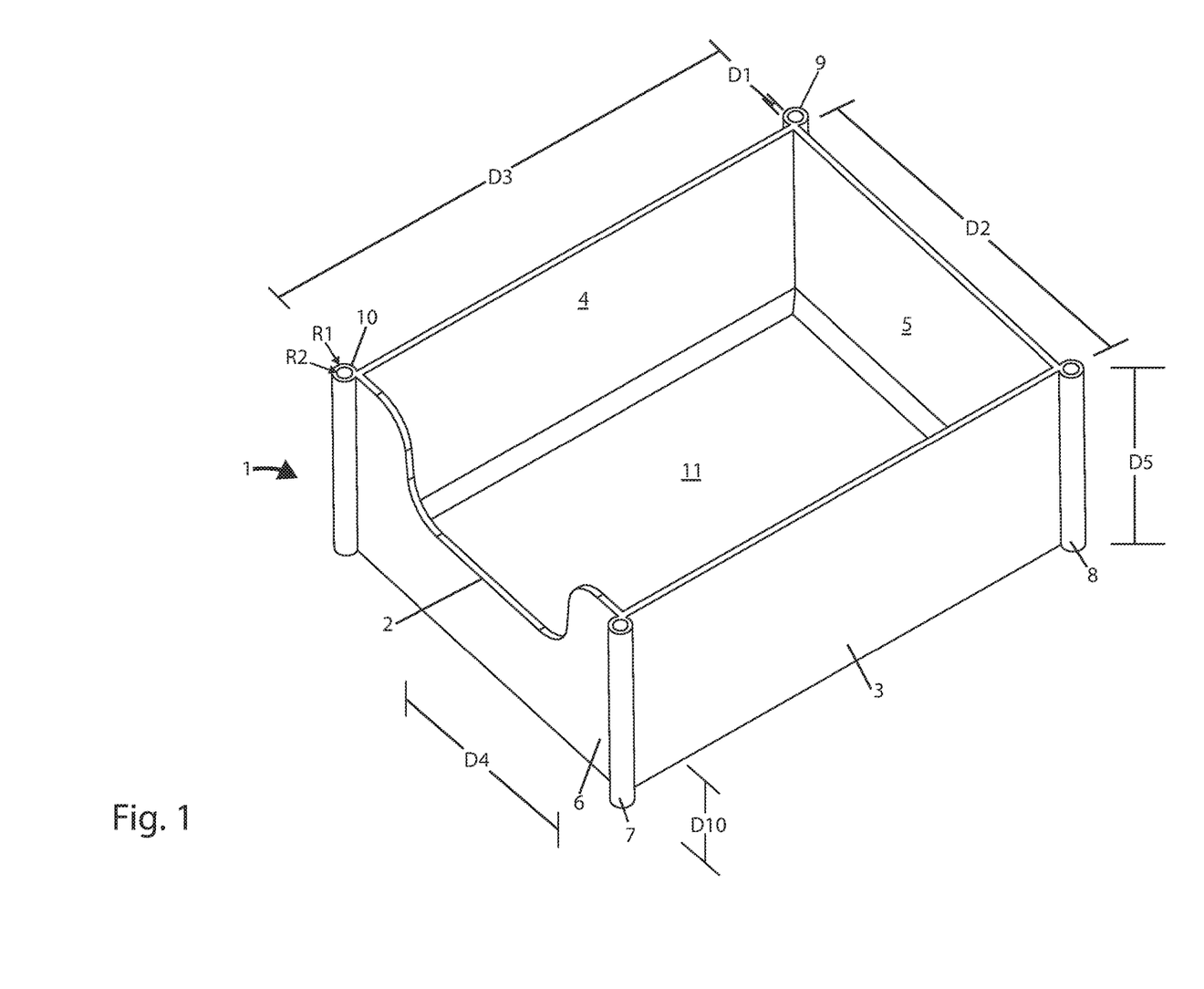
FIG. 1 is a top perspective view of a litter box.

Referring first to FIG. 1 a litter box 1 is preferably made of plastic. Normal dimensions are d1=0.11 inch, d2=10.94 inch, d3=14.21 inch, d4=5.31 inch, d5=8.0 inch, radius R1=0.40 inch, radius R2=0.25 inch, d10=4.0 inch. The pet entrance 2 comes down about half the height of the sides 3,4, and back 5. The front panel is labeled 6.

Figure 2:
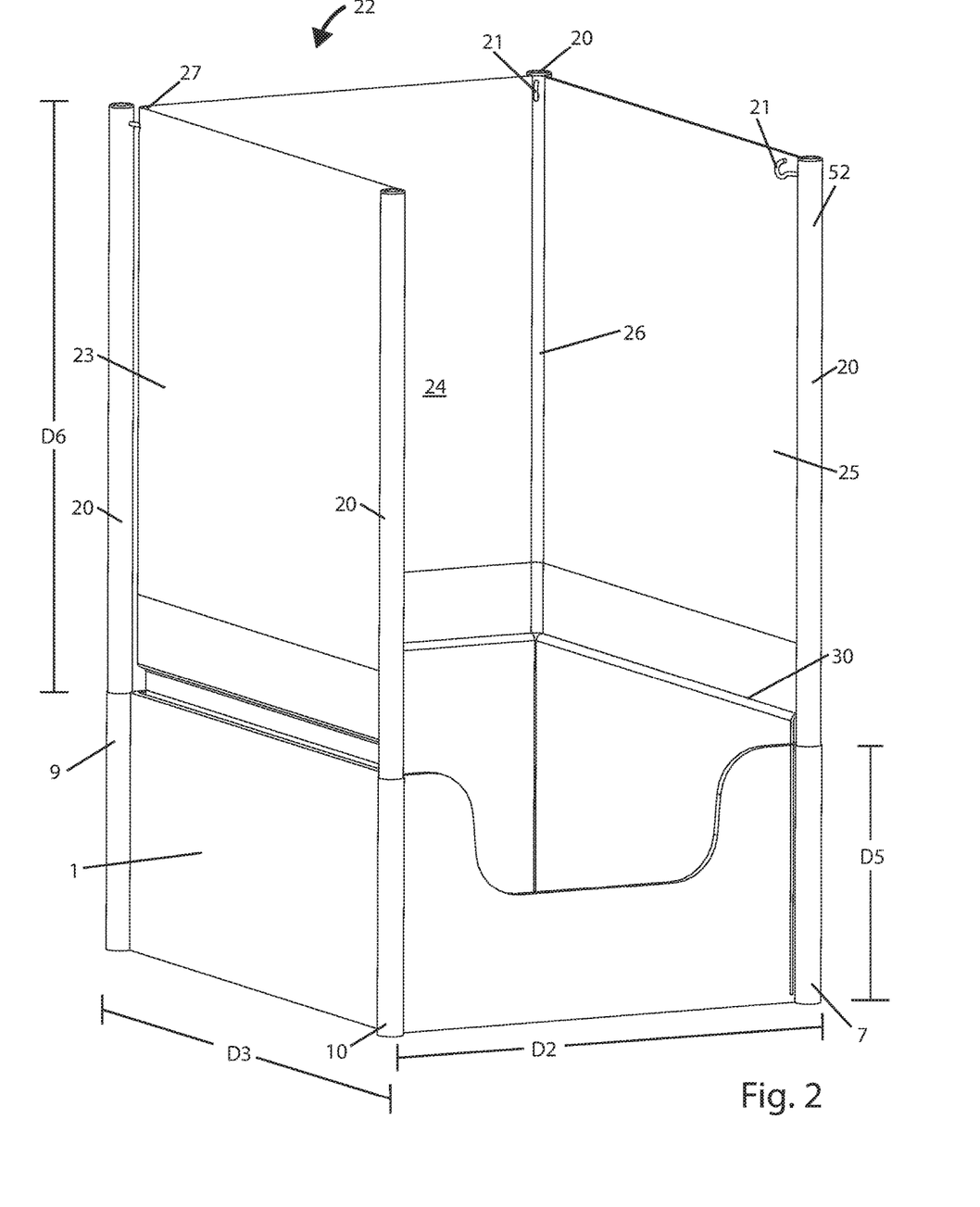
FIG. 2 is a front perspective view of a stiff curtain shield for the litter box shown in FIG. 1.

Each of the four corners has an anchor pole labeled 7,8,9,10. An alternate design (not shown) could have contoured bulges extending from the corners to provide an anchor hole strong enough to support a post 20 as shown in FIG. 2. The floor 11 is generally filled with several inches of kitty litter.

Figure 3:
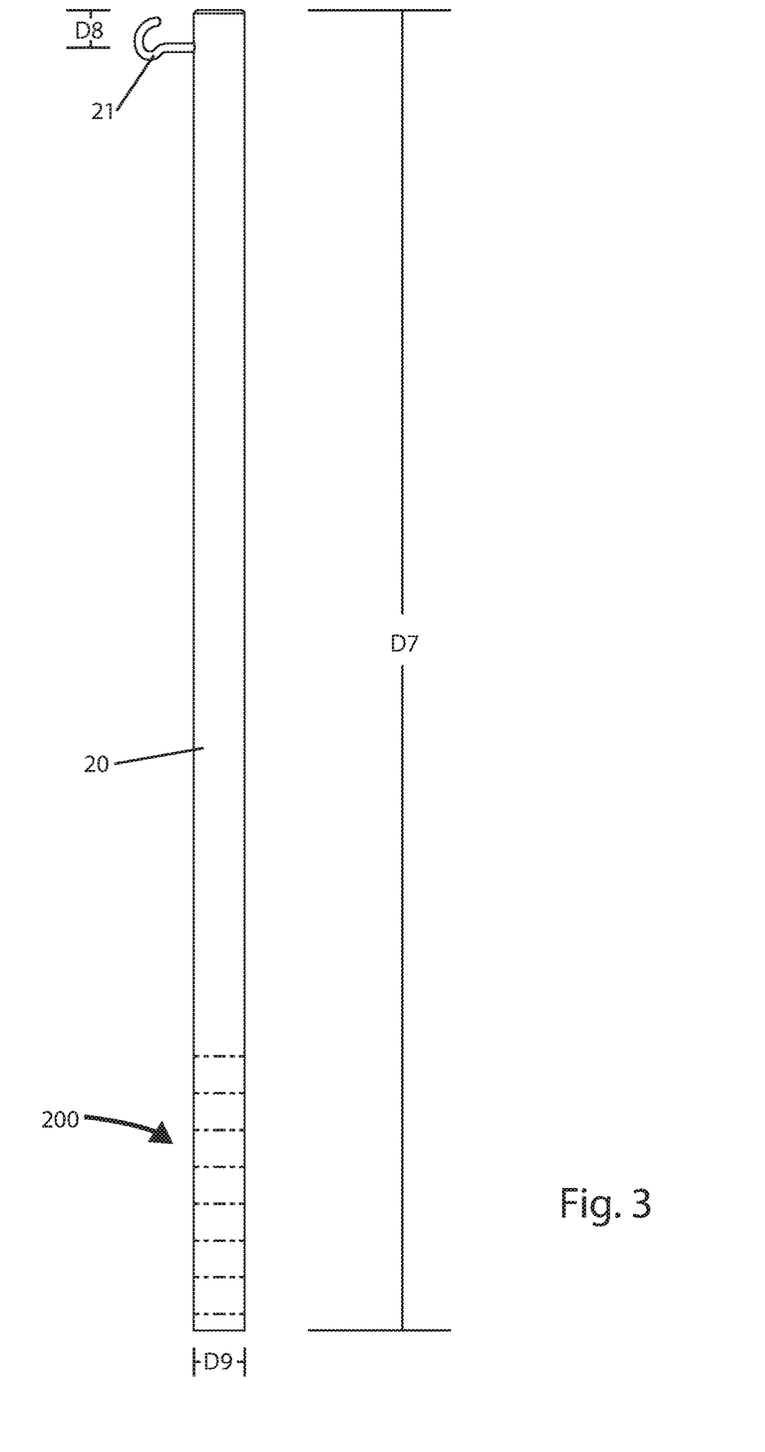
FIG. 3 is a side elevation view of the post shown in FIG. 2.

Referring next to FIGS. 2,3 nominal dimensions are d6=19.2 inch, d7=26.5 inch, d9=0.20 inch, d8=0.47 inch. A post 20 fits into each anchor pole 7,8,9,10. Each post 20 has a hook 21. A shield 22 is preferably a one piece of flexible silicone with walls 23, 25 and back 24. Living hinges 26, 27 connect the walls 23, 25 to the back 24. Upper holes (not labeled) on the shield 22 fit onto the hooks 21 to support the shield 22 at the upper edge of the walls 3,4 and back 5 of the litter box 1. In order to prevent urine from escaping under the shield 22, a gasket 30 is removably inserted under the shield 22. Various heights of shields 22 and posts 20 can be supplied. One embodiment (not shown) could have a break away lower segment of the shield 22 and a break away lower section on each post 20 to lower the dimension d6.

Figure 4:
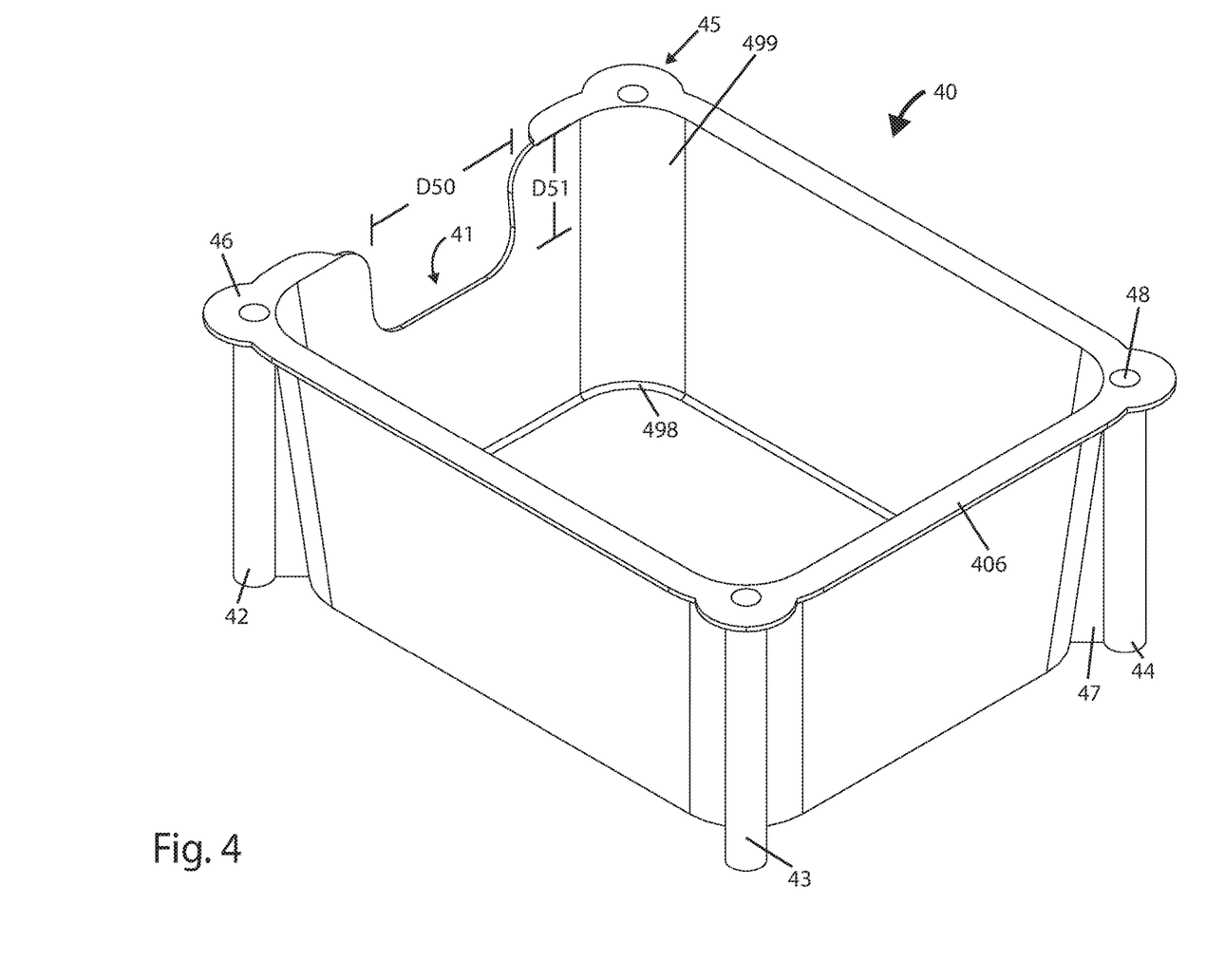
FIG. 4 is a rear perspective view of a preferred embodiment litter box 40 having slightly inclined walls.

Referring next to FIG. 4 a litter box 40 has a cutout 41 for a pet entrance. Dimensions are similar to litter box 1 shown in FIG. 1. The anchor poles 42,43, 44, 45 each have a top semi-circular flange 46 and a plastic support bridge 47 to the respective corner of the box itself. Each hole 48 receives a post 20. The pet entrance dimensions are d50=5 inches and d51=3 inches. All four walls have a five degree incline. The holes 48 go down to the bottom of each anchor pole. Each corner on the inside is contoured 499 to prevent dirt buildup. Each bottom corner is also contoured 498.

Figure 5:
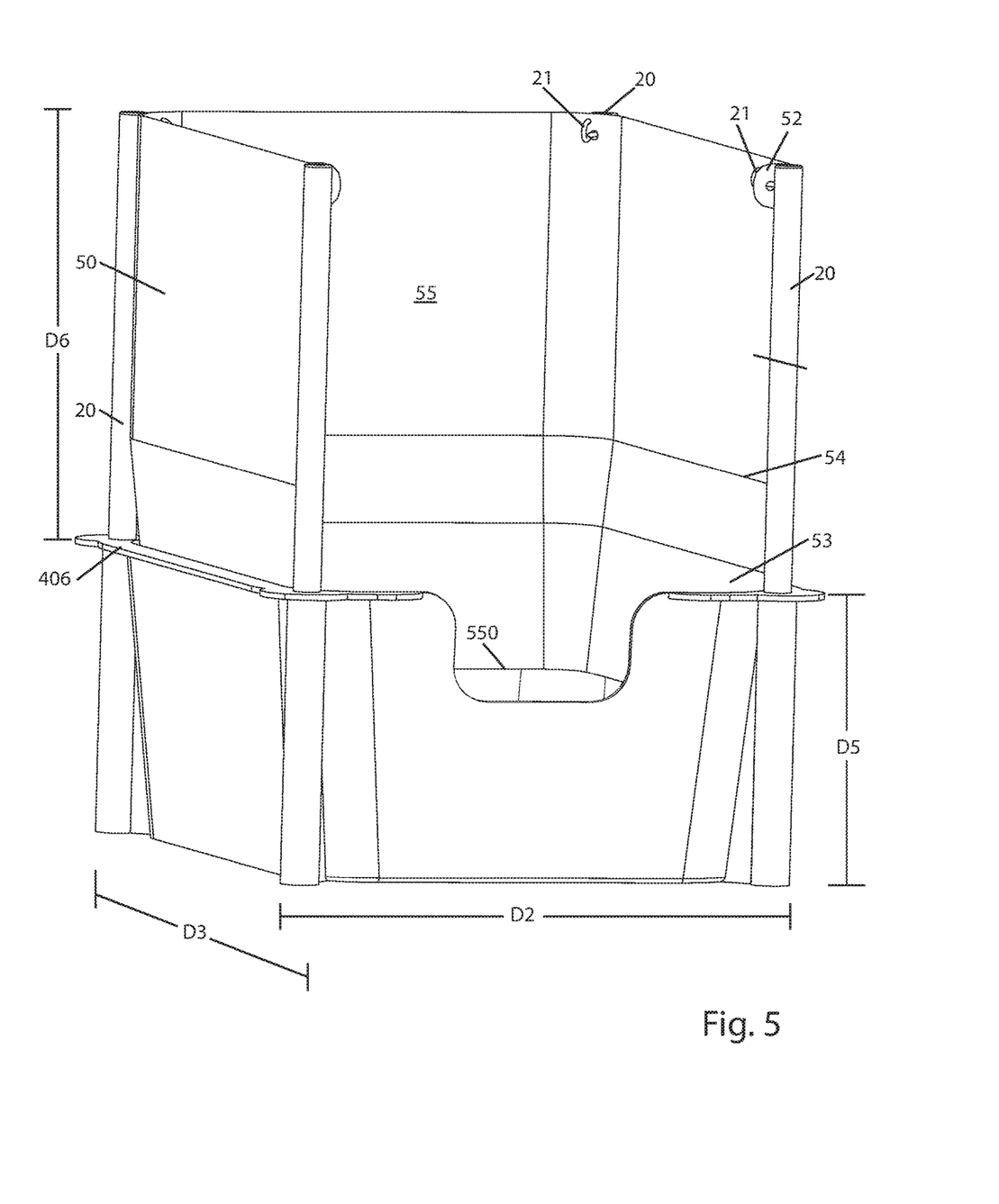
FIG. 5 is a front perspective view of litter box 40 with its flexible (silicone) curtain 50 installed.

Referring next to FIG. 5 the curtain 50 is a flexible silicone perhaps one ten thousandth inch thick. The user could use scissors to shorten its height and break off a segment of the poles 20 at lines 200 shown in FIG. 3. The incline of the walls prevents any spray from getting under the curtain.

Figure 6:
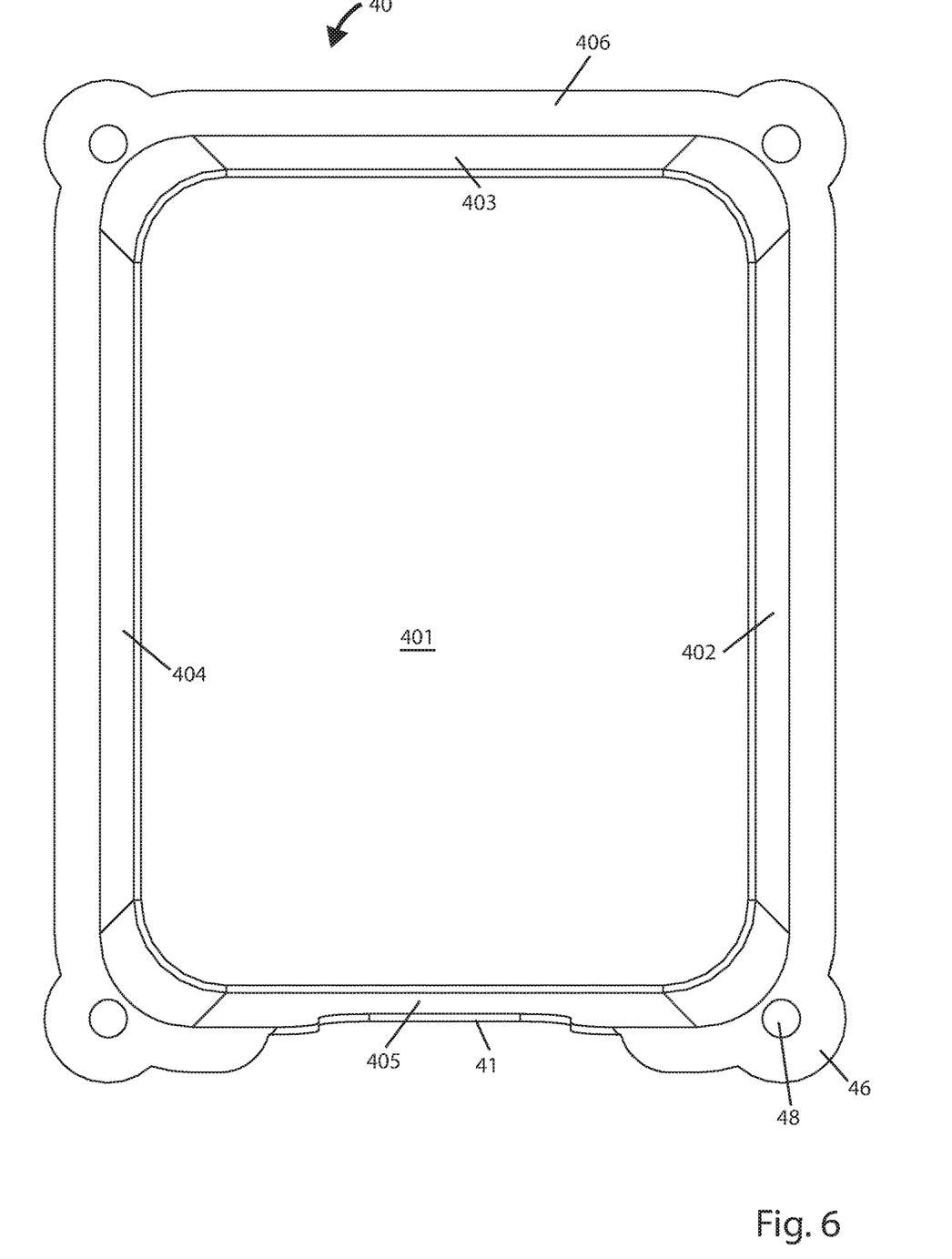
FIG. 6 is a top plan view of litter box 40.

Referring next to FIG. 6 the kitty litter 40 has a bottom 401, a front wall 405, longitudinal walls 402, 404 and a rear wall 403. A top ledge 406 extends over the walls.

Figure 7:
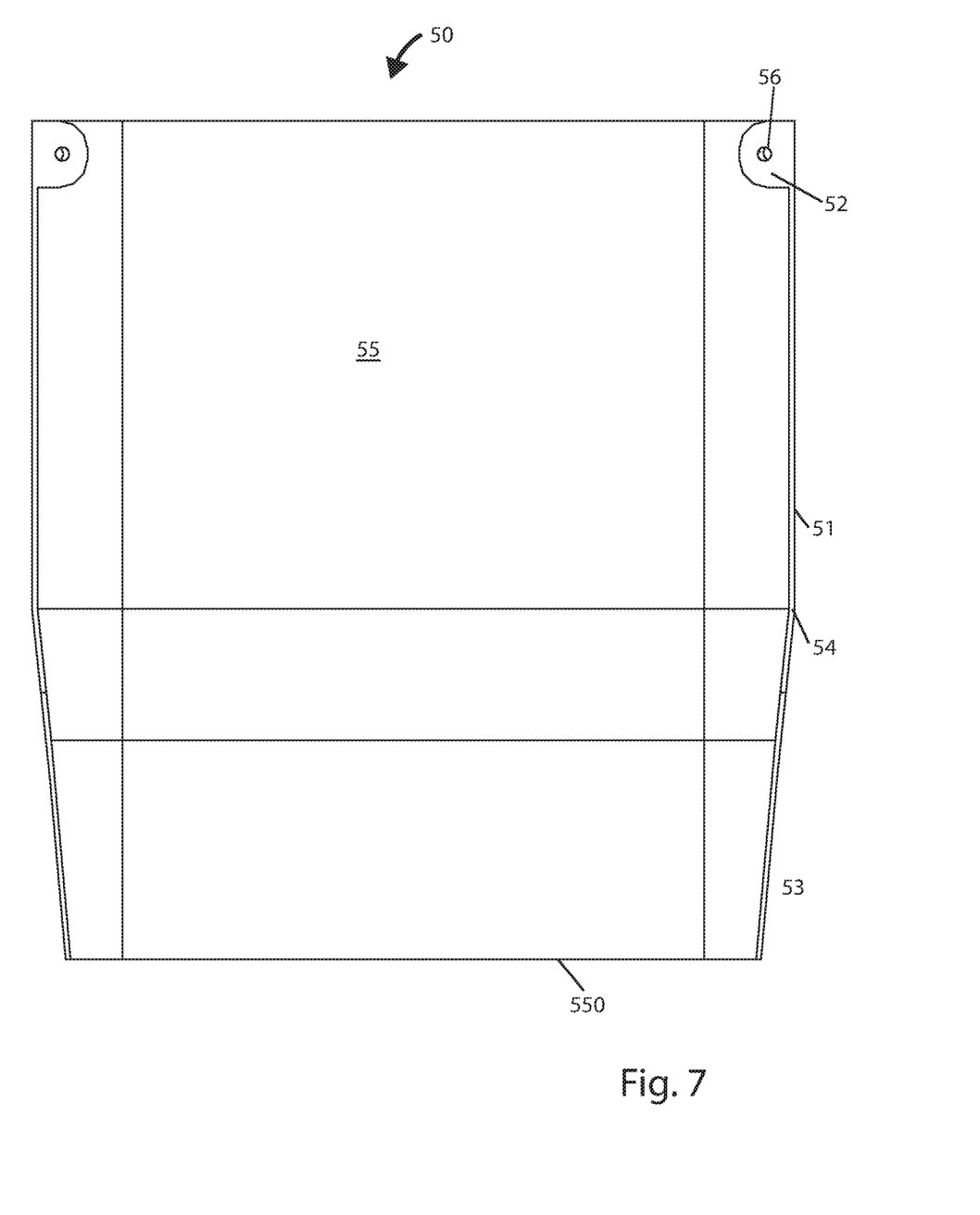
FIG. 7 is a front elevation view of the one piece curtain 50.

Referring next to FIG. 7 the curtain 50 has a five degree incline starting at section 54 which coincides with the top ledge 406. Front tabs 52 have holes 56 for hooking onto hooks 21 shown in FIG. 3. The upper curtain is labeled 51. The lower section is labeled 53. The rear wall is labeled 55. The bottom edge 550 is designed to hang about half way down the walls.

Figure 8:
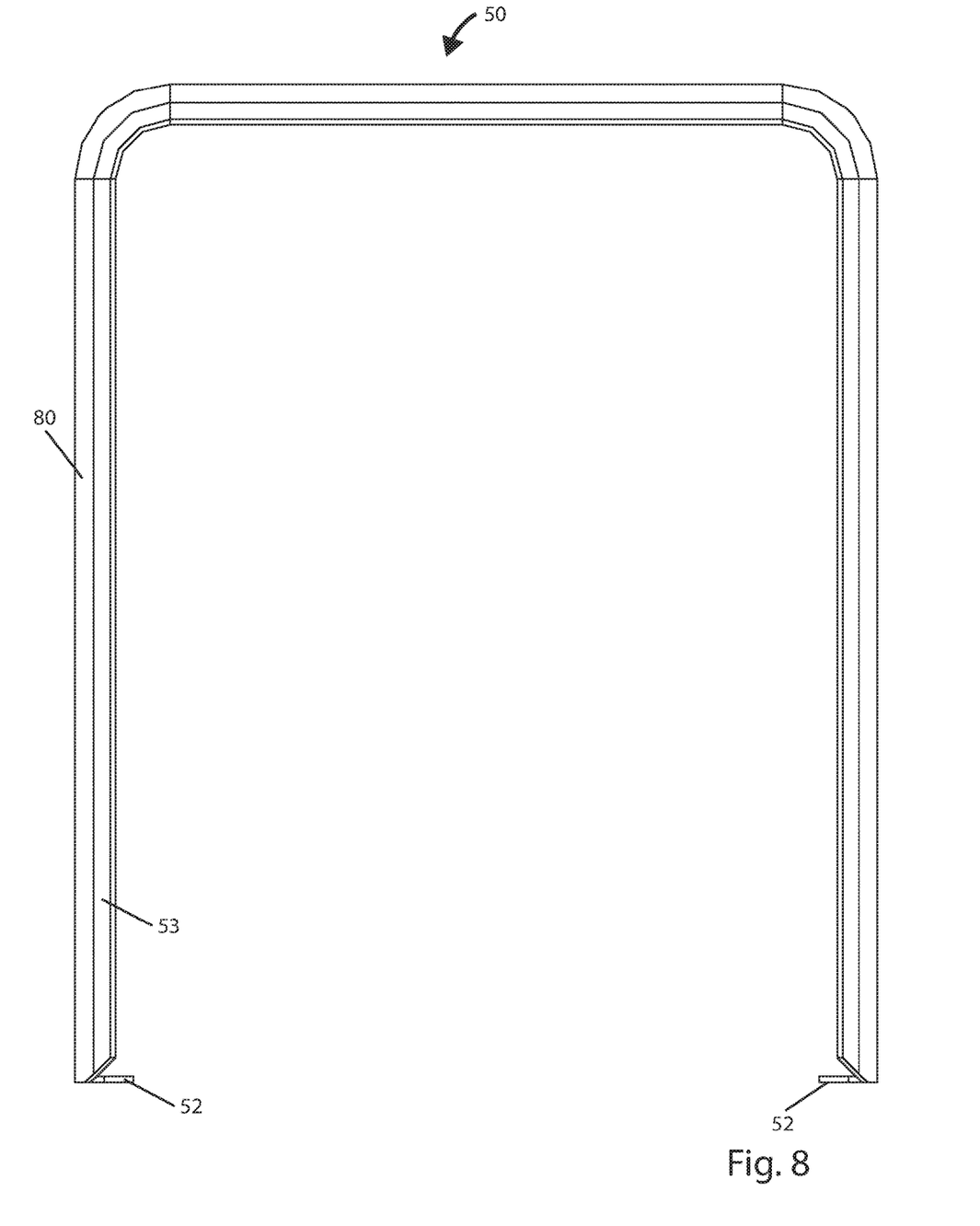
FIG. 8 is a top plan view of the curtain 50.

Referring next to FIG. 8 the curtain 50 shown in a top plan view shows a top edge 80 with the lower section 53 inclining inward.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:
1. A litter box comprising:
   a base having a bottom and walls forming corners; each corner having a thickness to support a post hole therein;
   a removable vertical post inserted into each post hole in each corner;
   each post having a top segment with an inwardly facing hook;

a single piece flexible curtain having holes along an upper segment to receive the hooks;

said curtain having a height to extend below a top edge of the walls, on the interior of the base;

said base having a pet entrance not covered by the curtain; and wherein each post further comprises a break off bottom segment.

2. The litter box of claim 1, wherein each corner at the bottom of the base and each side corner has a contour to eliminate a waste gathering point.

3. The litter box of claim 1, wherein at least two walls that are adjacent the curtain further comprise an inward incline to establish a contact with the curtain.

4. The litter box of claim 1, wherein the curtain further comprises a silicone composition.

5. The litter box of claim 1, wherein the base is a rectangle.

6. The litter box of claim 3, wherein the curtain further comprises a lower segment with an inward incline.

7. The rectangular litter box of claim 5 further comprising a contoured corner at each bottom corner and along each side corner to prevent a waste buildup.

8. The litter box of claim 1, wherein the curtain having a height to extend below a top edge of the walls extends one inch below the top edge of the walls.

* * * * *